(12) United States Patent
Liang et al.

(10) Patent No.: US 11,030,529 B2
(45) Date of Patent: Jun. 8, 2021

(54) EVOLUTION OF ARCHITECTURES FOR MULTITASK NEURAL NETWORKS

(71) Applicant: Cognizant Technology Solutions U.S. Corporation, College Station, TX (US)

(72) Inventors: Jason Zhi Liang, Fremont, CA (US); Elliot Meyerson, San Francisco, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 313 days.

(21) Appl. No.: 16/219,286

(22) Filed: Dec. 13, 2018

(65) Prior Publication Data
US 2019/0180188 A1    Jun. 13, 2019

Related U.S. Application Data

(63) Continuation of application No. 16/212,830, filed on Dec. 7, 2018.
(Continued)

(51) Int. Cl.
*G06N 3/04* (2006.01)
*G06N 3/08* (2006.01)

(52) U.S. Cl.
CPC .............. *G06N 3/086* (2013.01); *G06N 3/04* (2013.01)

(58) Field of Classification Search
CPC ................................ G06N 3/086; G06N 3/04
See application file for complete search history.

(56) References Cited

U.S. PATENT DOCUMENTS

| 5,140,530 A | 8/1992 | Guha et al. |
| 5,761,381 A | 6/1998 | Arci et al. |

(Continued)

FOREIGN PATENT DOCUMENTS

| EP | 0762294 A2 | 3/1997 |
| EP | 2422276 | 2/2012 |

(Continued)

OTHER PUBLICATIONS

Rosenbaum et al. "Routing networks: Adaptive selection of non-linear functions for multi-task learning." arXiv preprint arXiv: 1711.01239 (2017) (Year: 2017).*

(Continued)

*Primary Examiner* — Kakali Chaki
*Assistant Examiner* — Adam C Standke
(74) *Attorney, Agent, or Firm* — Dawn-Marie Bey; Bey & Cotropia PLLC

(57) ABSTRACT

Evolution and coevolution of neural networks via multitask learning is described. The foundation is (1) the original soft ordering, which uses a fixed architecture for the modules and a fixed routing (i.e. network topology) that is shared among all tasks. This architecture is then extended in two ways with CoDeepNEAT: (2) by coevolving the module architectures (CM), and (3) by coevolving both the module architectures and a single shared routing for all tasks using (CMSR). An alternative evolutionary process (4) keeps the module architecture fixed, but evolves a separate routing for each task during training (CTR). Finally, approaches (2) and (4) are combined into (5), where both modules and task routing are coevolved (CMTR).

10 Claims, 10 Drawing Sheets

Related U.S. Application Data

(60) Provisional application No. 62/662,082, filed on Apr. 24, 2018, provisional application No. 62/627,166, filed on Feb. 6, 2018, provisional application No. 62/598,409, filed on Dec. 13, 2017.

(56) References Cited

U.S. PATENT DOCUMENTS

| | | | |
|---|---|---|---|
| 5,845,266 A | 12/1998 | Lupien et al. | |
| 5,920,848 A | 7/1999 | Schutzer et al. | |
| 5,930,780 A | 7/1999 | Hughes et al. | |
| 6,240,399 B1 | 5/2001 | Frank et al. | |
| 6,249,783 B1 | 6/2001 | Crone et al. | |
| 7,013,344 B2 | 3/2006 | Megiddo | |
| 7,246,075 B1 | 7/2007 | Testa | |
| 7,370,013 B1 | 5/2008 | Aziz et al. | |
| 7,444,309 B2 | 10/2008 | Branke et al. | |
| 8,639,545 B2 | 1/2014 | Cases et al. | |
| 8,768,811 B2 | 7/2014 | Hodjat et al. | 705/36 R |
| 9,053,431 B1 | 6/2015 | Commons | |
| 9,466,023 B1 | 10/2016 | Shahrzad et al. | G06N 3/086 |
| 9,785,886 B1 | 10/2017 | Andoni et al. | |
| 2002/0019844 A1 | 2/2002 | Kurowski et al. | |
| 2003/0014379 A1 | 1/2003 | Saias et al. | |
| 2003/0158887 A1 | 8/2003 | Megiddo | |
| 2004/0143559 A1 | 7/2004 | Ayala | |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0136480 A1 | 6/2005 | Bralnnachuri et al. | |
| 2005/0187848 A1 | 8/2005 | Bonissone et al. | |
| 2005/0197875 A1 | 9/2005 | Kauffman | |
| 2005/0198103 A1 | 9/2005 | Ching | |
| 2006/0218107 A1 | 9/2006 | Young | |
| 2007/0100907 A1 | 5/2007 | Bayer | |
| 2007/0143198 A1 | 6/2007 | Brandes et al. | |
| 2007/0143759 A1 | 6/2007 | Ozgur et al. | |
| 2007/0150435 A1 | 6/2007 | Murakawa et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0327178 A1 | 12/2009 | Jacobson | |
| 2010/0030720 A1 | 2/2010 | Stephens | |
| 2010/0111991 A1 | 5/2010 | Raitano et al. | |
| 2010/0182935 A1 | 7/2010 | David | |
| 2010/0256795 A1 | 10/2010 | McLaughlin et al. | |
| 2010/0257228 A1 | 10/2010 | Staggs et al. | |
| 2010/0257605 A1 | 10/2010 | McLaughlin et al. | |
| 2010/0274742 A1 | 10/2010 | Hodjat et al. | |
| 2012/0239592 A1 | 9/2012 | Esbensen | |
| 2012/0313798 A1 | 12/2012 | Markram | |
| 2013/0311412 A1 | 11/2013 | Lazar et al. | |
| 2014/0011982 A1 | 1/2014 | Marasco et al. | |
| 2015/0288573 A1 | 10/2015 | Baughman et al. | |
| 2016/0048753 A1 | 2/2016 | Sussillo et al. | |
| 2016/0063359 A1 | 3/2016 | Szegedy et al. | |
| 2016/0329047 A1 | 11/2016 | Tur | H10L 15/063 |
| 2016/0364522 A1 | 12/2016 | Frey et al. | |
| 2017/0109355 A1 | 4/2017 | Li et al. | |
| 2017/0193367 A1 | 7/2017 | Miikkulainen et al. | |
| 2017/0213156 A1 | 7/2017 | Hammond et al. | |
| 2017/0323636 A1 | 11/2017 | Xiao et al. | |
| 2018/0053092 A1 | 2/2018 | Hajizadeh | |
| 2018/0114115 A1 | 4/2018 | Liang et al. | |
| 2018/0114116 A1 | 4/2018 | Liang et al. | |
| 2018/0157972 A1* | 6/2018 | Hu | G06N 3/0454 |
| 2018/0240041 A1 | 8/2018 | Koch et al. | |

FOREIGN PATENT DOCUMENTS

| | | | |
|---|---|---|---|
| EP | 2422278 | 2/2012 | |
| JP | 08-110804 | 4/1996 | |
| JP | H09114797 | 5/1997 | |
| JP | 2001325041 | 11/2001 | |
| JP | 2003044665 | 2/2003 | |
| JP | 2004240671 | 8/2004 | |
| JP | 2004302741 | 10/2004 | |
| JP | 2005190372 | 6/2007 | |
| JP | 2007207173 | 8/2007 | |
| JP | 2007522547 | 8/2007 | |
| JP | 2008129984 | 6/2008 | |
| WO | WO 2005/073854 | 8/2005 | |
| WO | WO 2010/120440 | 10/2010 | |
| WO | WO 2017/161233 | 9/2017 | G06N 5/04 |
| WO | WO 2018/211138 | 11/2018 | G06N 3/08 |
| WO | WO 2018/213840 | 11/2018 | G06N 3/04 |
| WO | WO-2019081705 A1 * | 5/2019 | G06N 3/086 |

OTHER PUBLICATIONS

Bredeche et al. "On-line, on-board evolution of robot controllers." International Conference on Artificial Evolution (Evolution Artificielle). Springer, Berlin, Heidelberg, 2009 (Year: 2009).*

Stanley et al. "Evolving neural networks through augmenting topologies." Evolutionary computation 10.2 (2002) (Year: 2002).*

International Search Report and Written Opinion for PCT Application No. PCT/US18/65472, dated Mar. 27, 2019, 8 pp.

Bredeche, et al., "On-Line, On-Board Evolution of Robot Controllers," In: Artificial Evolution: $9^{th}$ International Conference, Evolution Artificielle, EA, 2009, Strasbourg, France, Oct. 26-28, 2009 [online], [retrieved on Mar. 15, 2019], Retrieved from the Internet: https://dl.acm.org/citation.cfm?id=1883723.1883738.

Rosenbaum, et al., "Routing Networks: Adaptive Selection of Non-Linear Funcdtions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.

Bonadiman, et al., "Multitask Learning with Deep Neural Networks for Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.

Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098.

Li, Xiaodong, and Michael Kirley. 'The effects of varying population density in a fine--grained parallel genetic algcrithmi' Evolutionary Computation. 2002. CEC'02. Proceedings of the 2002 Congress on. vol. 2. IEEE. 2002.

Fidelis. Marcos Vinicius, Heitor S. Lopes, and Alex A. Freitas. "Discovering comprehensible classification rules with a genetic algorithm." Evolutionary Computation. 2000. Proceedings of the 2000 Congress on. vol. 1. IEEE. 2000.

Dec. 23, 2008 International Search Report and Written Opinion for PCT/US2008/82876, 10 pp.

Koza. J.R, "Genetic Programming: On the Programming of Computers by Means of Natural Selection", Dec. 1992, MIT Press. pp. 1-609.

Nov. 26, 2012 Extended EP SR for EP 08847214, 9 pp.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Tanevi et al., "Scalable architecture for parallel distributed implementation of genetic programming on network of workstations," J. Systems Architecture, vol. 47, Jul. 2001, pp. 557-572.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/introduction to E volutionary Algorithms.pdf).

Poli R et al., "Genetic Prograramig: An introductory Tutorial and a Survey of Techniques and Applications," Univ. Essex School of Computer Science and Eletronic Engineering Technical Report No. CES-475, Oct. 2007, 112 pp.

(56) References Cited

OTHER PUBLICATIONS

Jun. 16, 2011 Written Opinion from Singapore Patent Office in related application SG 201003127-6, 9 pp.
Apr. 20, 2012 Exam Report for related application AU 2008323758, 2 pp.
Sakauchi et al., "UNIFINE: A Next Generation Financial Solution System of Nihon Unisys Ltd., Technology Review Unisys", Japan, Nihon Unisys Ltd., Feb. 28, 2006, vol. 25, No. 4, pp. 14-15.
JP 2010-533295, Office Action dated Apr. 16, 2013, 12 pages.
U.S. Appl. No. 14/014,063—Office Action dated May 7, 2014, 19 pages.
JP 2012-508663—Office Action dated Apr. 1, 2014, 6 pages (with English Translation).
JP 2012-508660—Office Action dated Apr. 1, 2014, 8 pages (with English Translation).
International Search Report dated Jun. 29, 2010 in PCT/US10/32841.
M.-R Akbarzadeh-T. et al., "Friendship Modeling for Cooperative: Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1)2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO-2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc EvoWorkshops 2002, 267-299 (12 pp).
BA Whitehead, "Genetic Evolution of Radial Basis Function Coverage Using Orthogonal Niches," IEEE Transactions on Neural Networks, 7:6, (1996) 1525-28.
AS Wu et al., "An incremental fitness function for partitioning parallel tales," Proc. Genetic and Evolutionary Computation Conf. (2001) 8pp.

Supplementary European Search Report dated Oct. 12, 2012 in EP 10770288.
Supplementary European Search Report dated Oct. 9, 2012 in EP 10770287.
Lopez Haimes et al., "MRMOGA: parallel evolutionary multi-objective optimization using multiple resolutions," In: Proceedings of IEEE Congress on Evolutionary Computation, 2294-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, Computational Optimization and Applications," Computational Optimization and Application Journal, 2009, 42(1), 105-139.
Leon et al. Parallel Hypervolume-Guided Hyperheuristic for Adapting the Multi-objective Evolutionary Island Model. NICSO 2008: 261-272.
U.S. Appl. No. 13/895,238—Office Action dated Jan. 2, 2014, 17 pages.
Aug. 1, 2012 Office Action in U.S. Appl. No. 13/443,546, 12 pp.
Jun. 22, 2011 Office Action in U.S. Appl. No. 12/267,287, 16 pp.
Jul. 27, 2012 Final Office Action in U.S. Appl. No. 12/267,287, 14 pp.
AU 2010241594—Examination Report dated Oct. 8, 2013, 3 pages.
AU 2010241597—Examination Report dated Nov. 4, 2013, 4 pages.
Myers, R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report dated Jul. 2, 2010 in PCT/US10/32847.
Stanley, Kenneth O., et al., "Real-time evolution of neural networks in the NERO video game." AAAI. vol. 6. 2006, 4 pages.
U.S. Appl. No. 15/794,913—Non-Provisional Application filed Oct. 26, 2017, 73 pages.
Scott, E. O., et al., "Understanding Simple Asynchronous Evolutionary Algorithms," Jan. 17-20, 2015, 15 pp.
International Search Report and Written Opinion for Application No. PCT/US2018/064520, dated Mar. 4, 2019, 8 pp.
Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.
Garcia-Pedrajas, et al., "Cooperative Coevolution of Artificial Neural Network Ensembles for Pattern Classification," IEEE Transactions on Evolutionary Computation, vol. 9, No. 3, Jun. 3, 2005.
Snoek, J., et al., "Scalable Bayesian Optimization Using Deep Neural Networks," arXiv: 1502.05700v2, Jul. 13, 2015.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=lwAR3hreOvBGmJZe54-631X49XedcbsQoDYIRu87BcCHEBf_vMKF8FDKK_7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.
International Search Report and Written Opinion for PCT Application No. PCT/US2019/017175, dated Jun. 5, 2019, 10 pp.
E. Meyerson and R. Miikkulainen, "Pseudo-Task Augmentation: From Deep Multitask Learning to Intratask Sharing and Back," ICML, 2018.
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Gonzalez, et al., "Evolving Loss Functions With Multivariate Taylor Polynomial Parameterizations," Version 1, published arXiv: 2002.00059v1, Jan. 31, 2020.

(56) References Cited

OTHER PUBLICATIONS

Gonzalez, et al., "Evolving Loss Functions With Multivariate Taylor Polynomial Parameterization," Version 2, published arXiv: 2002.00059v2), Feb. 10, 2020.
Gonzalez, et al., "Optimizing Loss Functions Through Multivariate Taylor Polynomial Parameterization," Version 3 (published arXiv:2002.00059v3), Jun. 6, 2020.
N. Hansen, et al, "Adapting arbitrary normal mutation distributions in evolution strategies: The covariance matrix adaptation," In Proceedings of IEEE International Conference on Evolutionary Computation, pp. 312-317, IEEE, 1996.
Hansen, et al., "Completely derandomized self-adaptation in evolution strategies," Evolutionary Computation, vol. 9, No. 2, pp. 159-195, 2001.
N. Hansen, et al., "Evaluating the CMA evolution strategy on multimodal test functions," International Conference on Parallel Problem Solving from Nature, Springer, pp. 282-291, 2004.
H. Li, et al., "Visualizing the loss landscape of neural nets," Advances in Neural Information Processing Systems 31, pp. 6389-6399 (Curran Associates, Inc., 2018).
Liang, et al, "Population-Based Training for Loss Function Optimization," arXiv:2002.04225v1 (Feb. 11, 2020).
"Python vs. R for Artificial Intelligence, Machine Learning, and Data Science," by Scenario or Task by Alex Castrounis of Innoarchitech, published online by O'Reilly Media, Copyright InnoArchiTech LLC 2020.
Production vs Development Artificial Intelligence and Machine Learning, by Alex Castrounis of Innoarchitech, published online by O'Reilly Media, Copyright InnoArchiTech LLC 2020.
"Advanced Analytics Packages, Frameworks, and Platforms by Scenario or Task," by Alex Castrounis of Innoarchitech, published online by O'Reilly Media, Copyright InnoArchiTech LLC 2020.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019.
Santiago Gonzalez, et al., "Improved Training Speed, Accuracy, and Data Utilization Through Loss Function Optimization," Version 2, arXiv: 1905.11528v2, dated Feb. 10, 2020.
Santiago Gonzalez, et al., "Improved Training Speed, Accuracy, and Data Utilization Through Loss Function Optimization," Version 3, arXiv: 1905.11528v3, dated Apr. 27, 2020.
J. T. Barron, "A General and Adaptive Robust Loss Function," arXiv: 1701.03077, 2017.
K. Janocha and W. M. Czarnecki, "On Loss Functions for Deep Neural Networks in Classification," arXiv: 1702.05659, 2017.
A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.
Fernando et al., "Pathnet: Evolution channels gradient descent in super neural networks," arXiv preprint arXiv:1701.08734 (2017), 16 pages.
Yang et al., "Deep multi-task representation learning: A tensor factorisation approach," arXiv preprint arXiv:1605.06391 (2016), 12 pages.
Shazeer et al., "Outrageously large neural networks: The sparsely-gated mixture-of-experts layer," arXiv preprint arXiv:1701.06538 (2017), 19 pages.
Misra et al., "Cross-stitch networks for multi-task learning," In Proceedings of the IEEE Conference on Computer Vision and Pattern Recognition, pp. 3994-4003. 2016.
Kenneth O. Stanley and Risto Miikkulainen, "Evolving Neural Networks Through Augmenting Topologies," Evolutionary Computation, 10(2): 99-127, 2002.
International Search Report and Written Opinion for PCT Application No. PCT/US18/64428, dated Mar. 26, 2019, 12 pp.
J. Z. Liang, E. Meyerson, and R. Miikkulainen, 2018, Evolutionary Architecture Search for Deep Multitask Networks, GECCO (2018), Jul. 15-19, 2018, Kyoto, Japan.
E. Meyerson and R. Miikkulainen, 2018, "Beyond Shared Hierarchies: Deep Multitask Learning Through Soft Layer Ordering," ICLR (2018).
R. Miikkulainen, J. Liang, E. Meyerson, et al., 2017, "Evolving Deep Neural Networks," CoRR, abs/1703.00548, Mar. 2017.
U.S. Appl. No. 15/794,905, titled "Evolution of Deep Neural Network Structures," filed Oct. 26, 2017.
U.S. Appl. No. 15/794,913, titled "Cooperative Evolution of Deep Neural Network Structures," filed Oct. 26, 2017.
U.S. Appl. No. 15/915,028, titled "Asynchronous Evaluation Strategy for Evolution of Deep Neural Networks," filed Mar. 3, 2018.
Risto Miikkulainen, "Evolving Multitask Neural Network Structure," The University of Texas at Austin and Sentient Technologies, Inc., Aug. 26, 2013.
Aditya Rawal and Risto Miikkulainen, "From Nodes to Networks: Evolving Recurrent Neural Networks," GECCO '18, Jul. 15-19, 2018, Kyoto, Japan.
International Search Report and Written Opinion for PCT App. No. PCT/US19/61198, dated Mar. 11, 2020, 15 pp.
Moriarty, David E., et al., "Forming neural networks through efficient and adaptive coevolution," Evolutionary Computation 5.4, 1997.
Lee, Chi-Ho, et al., "Evolutionary ordered neural network with a linked-list encoding scheme," Proceedings of IEEE International Conference on Evolutionary Computation, IEEE, 1996.
Utech, J., et al., "An evolutionary algorithm for drawing directed graphs," Proc. of the Int. Conf. on Imaging Science, Systems and Technology, 1998.
International Preliminary Report on Patentability for PCT App. No. PCT/US2019/061198, dated Nov. 18, 2020, 24 pp.

* cited by examiner

EVOLUTION OF ARCHITECTURES FOR MULTITASK NEURAL NETWORKS

CROSS-REFERENCE TO RELATED APPLICATIONS

The present application claims the benefit of priority to: U.S. Provisional Patent Application No. 62/598,409 for EVOLVING MULTITASK NEURAL NETWORK STRUCTURE filed on Dec. 13, 2017, which is incorporated herein by reference in its entirety and is a continuation of U.S. application Ser. No. 16/212,830 entitled EVOLUTIONARY ARCHITECTURES FOR EVOLUTION OF DEEP NEURAL NETWORKS filed Dec. 7, 2018 which claims benefit of priority to U.S. Provisional Patent Application No. 62/627,166 for EVOLUTIONARY ARCHITECTURE SEARCH FOR DEEP MULTITASK NETWORKS filed Feb. 6, 2018; U.S. Provisional Patent Application No. 62/662,082 for EVOLUTIONARY ARCHITECTURES FOR EVOLUTION OF DEEP NEURAL NETWORKS filed Apr. 24, 2018; and U.S. Provisional Patent Application No. 62/598,409 for EVOLVING MULTITASK NEURAL NETWORK STRUCTURE filed on Dec. 13, 2017, each of which is incorporated herein by reference in their entireties.

INCORPORATIONS

In addition to the applications referenced above, the following materials are incorporated by reference as if fully set forth herein: J. Z. Liang, E. Meyerson, and R. Miikkulainen, "EVOLUTIONARY ARCHITECTURE SEARCH FOR DEEP MULTITASK NETWORKS," GECCO (2018) Jul. 15-19, 2018, Kyoto, Japan and "FROM NODES TO NETWORKS: EVOLVING RECURRENT NEURAL NETWORKS," by Aditya Rawal and Risto Miikkulainen, GECCO, Jul. 15-19, 2018, Kyoto, Japan; and "EVOLVING DEEP NEURAL NETWORKS" by Miikkulainen et al., CoRR, abs/1703.00548, March 2017.

FIELD OF THE TECHNOLOGY DISCLOSED

The technology disclosed is directed to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed generally relates to evolving neural networks architectures which are then used to solve complex problems.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In multitask learning (MTL), a neural network is trained simultaneously to perform several different tasks at once. For instance, given an image as input, it can recognize the objects in it, identify the type of scene, and generate a verbal caption for it. Typically, the early parts of the network are shared between tasks, and the later parts, leading to the different tasks, are separate. The network is trained with gradient descent in all these tasks, and therefore the requirements of all tasks are combined in the shared parts of the network. The embeddings thus reflect the requirements of all tasks, making them more robust and general. Performance of a multitask network in each task can therefore exceed the performance of a network trained in only a single task.

Designing deep neural network architectures for multitask learning is a challenge: there are many ways to tie the tasks together, and the design choices matter. Much of the research in deep learning in recent years has focused on coming up with better architectures, and MTL is no exception. As a matter of fact, architecture plays possibly an even larger role in MTL because there are many ways to tie the multiple tasks together. The best network architectures are large and complex, and have become very hard for human designers to optimize.

MTL exploits relationships across problems to increase overall performance. The underlying idea is that if multiple tasks are related, the optimal models for those tasks will be related as well. In the convex optimization setting, this idea has been implemented via various regularization penalties on shared parameter matrices. Evolutionary methods have also had success in MTL, especially in sequential decision-making domains.

Deep MTL has extended these ideas to domains where deep learning thrives, including vision, speech, natural language processing, and reinforcement learning. The key design decision in constructing a deep multitask network is deciding how parameters such as convolutional kernels or weight matrices are shared across tasks. Designing a deep neural network for a single task is already a high-dimensional open-ended optimization problem; having to design a network for multiple tasks and deciding how these networks share parameters grows this search space combinatorially. Most existing approaches draw from the deep learning perspective that each task has an underlying feature hierarchy, and tasks are related through an a priori alignment of their respective hierarchies. Another existing approach adapts network structure by learning task hierarchies, though it still assumes this strong hierarchical feature alignment.

Soft ordering is a recent approach that avoids such an alignment by allowing shared layers to be used across different depths. Through backpropagation, the joint model learns how to use each shared (potentially nonlinear) layer $W_d$ at each depth d for the t-th task. This idea is implemented by learning a distinct scalar $s_{tdl}$ for each such location, which then multiplies the layer's output. The final output at depth d for the task is then the sum of these weighted outputs across layers, i.e., a soft merge. FIG. 1 illustrates an exemplary soft ordering network with three shared layers. Soft ordering learns how to use the same layers in different locations by learning a tensor S of task-specific scaling parameters. S is learned jointly with the $W_d$, to allow flexible sharing across tasks and depths. This architecture enables the learning of layers that are used in different ways at different depths for different tasks.

Although soft ordering allows flexible sharing across depths, layers are still only applied in a fixed grid-like topology, which biases and restricts the type of sharing that can be learned.

As deep learning tasks and benchmarks become increasing complex, finding the right architecture becomes more important. In fact, the performance of many state of the art networks depend mostly on novel and interesting architectural innovations. Unfortunately, discovering useful hyperparameters and architectures by hand is tedious and difficult; as a result, much research focuses on developing automated methods for doing it. Some promising methods for hyperparameter search include deep Bayesian optimization and CMA-ES. One unique approach uses reinforcement learning to develop an LSTM policy for generating appropriate network topologies and hyperparameters for a given task.

One particularly promising area of research is the use of evolutionary algorithms (EAs) for performing architecture search. Evolutionary methods are well suited for these kinds of problems because they can be readily applied with no gradient information. Some of these approaches use a modified version of NEAT, an EA for neuron-level neuroevolution, for searching network topologies.

Others rely on genetic programming or hierarchical evolution. Along these lines, CoDeepNEAT combines the power of NEAT's neural topology search with hierarchical evolution to efficiently discover architectures within large search spaces. Networks evolved using CoDeepNEAT have achieved good results in image classification and image captioning domains, outperforming popular hand-designed architectures. The paper entitled "Evolving Deep Neural Networks" by Miikkulainen et al., CoRR, abs/1703.00548, March 2017, is descriptive of the CoDeepNeat method and is incorporated herein by reference.

CoDeepNEAT begins by initializing two populations, one of modules and one of blueprints, with minimal complexity. The blueprints and modules each contain at least one species and are evolved/complexified separately with a modified version of NEAT. An individual in the blueprint population is a directed acyclic graph (DAG) where each node contains a pointer to a particular module species. An individual in the module population is a DAG where each node represents a particular DNN layer and its corresponding hyperparameters (number of neurons, activation function, etc.). As shown in FIG. 2, in a method of assembling networks for fitness evaluation in CoDeepNEAT, modules from species specified in the blueprint are inserted into locations specified in the blueprint, forming a temporary population of assembled networks. This approach allows evolving repetitive and deep structures seen in many successful DNNs. Each individual in this population is then evaluated by training it on a supervised learning task, and assigning its performance as fitness. The fitnesses of the individuals (networks) are attributed back to blueprints and modules as the average fitness of all the assembled networks containing that blueprint or module. One of the advantages of CoDeepNEAT is that it is capable of discovering modular, repetitive structures seen in state of the art networks such as Googlenet and Resnet.

Accordingly, there remains a need in the art for improved methods for designing deep neural network architectures for multitask learning.

SUMMARY OF THE EMBODIMENTS

The embodiments presented herein describe an automated, flexible approach for evolving architectures, i.e. hyperparameters, modules, and module routing topologies, of deep multitask networks. A recent deep MTL architecture called soft ordering is used as a starting point, in which a different soft sequence of modules is learned for each task. The present embodiments extend this architecture in several ways. First, a novel algorithm for evolving task specific routings that create a unique routing between modules for each task is employed. Second, more general modules with the same soft ordering architecture are evolved. Third, the general modules are evolved together with a blueprint, a shared routing for all tasks, that improves upon the soft ordering architecture. Fourth, as a capstone architecture, the task specific routing are evolved together with the general modules. Accordingly, the present embodiments generalize soft ordering layers to more general modules, and introduce evolutionary approaches to both design these modules and to discover how to assemble these modules into appropriate topologies for multitask learning.

In a first exemplary embodiment, a processor implemented method for evolving task-specific topologies in a multitask architecture includes: establishing a set of shared modules which are shared among each task-specific topology; initializing the shared modules $\{M_k\}_k^K=1$ with random weights; initializing a champion individual module routing scheme for each task (t), wherein the ith individual for the tth task is represented by a tuple $(E_{ti}, G_{ti}, D_{ti})$, and further wherein $E_{ti}$ is an encoder, $G_{ti}$ is a DAG, which specifies the individual module routing scheme, and $D_{ti}$ is a decoder, with $E_{t1}$ and $D_{t1}$ initialized with random weights; for each champion individual $(E_{t1}, G_{t1}, D_{t1})$, generating a challenger $(E_{t2}, G_{t2}, D_{t2})$ by mutating the tth champion in accordance with a predetermined mutation subprocess; jointly training each champion and challenger for M iterations on a training set of data; evaluating each champion and challenger on a validation set of data to determine an accuracy fitness for each individual champion and challenger for its predetermined task; if a challenger has higher accuracy fitness than a corresponding champion, then the champion is replaced wherein $(E_{t1}, G_{t1}, D_{t1})=(E_{t2}, G_{t2}, D_{t2})$; calculating an average accuracy fitness across all champions for tasks in the multitask architecture; and checkpointing the shared modules when the average accuracy is best achieved.

In a second exemplary embodiment, a processor implemented method for evolving task-specific topologies and shared modules in a multitask architecture includes: initializing a population of modules and randomly selecting modules (m) from each species in the population and grouping selected modules from each species (k) together into sets of modules $M_k$; providing the sets of modules $M_k$ to a task-specific routing evolution subprocess, wherein the subprocess: establishes a set of shared modules which are shared among each task-specific topology; initializes a champion individual module routing scheme for each task (t), wherein the ith individual for the tth task is represented by a tuple $(E_{ti}, G_{ti}, D_{ti})$, and further wherein $E_{ti}$ is an encoder, $G_{ti}$ is a DAG, which specifies the individual module routing scheme, and $D_{ti}$ is a decoder, with $E_{t1}$ and $D_{t1}$ initialized with random weights; for each champion individual $(E_{t1}, G_{t1}, D_{t1})$, generating a challenger $(E_{t2}, G_{t2}, D_{t2})$ by mutating the tth champion in accordance with a predetermined mutation subprocess; jointly training each champion and challenger for M iterations on a training set of data; evaluating each champion and challenger on a validation set of data to determine an accuracy fitness for each individual champion and challenger for its predetermined task; if a challenger has higher accuracy fitness than a corresponding champion, then the champion is replaced wherein $(E_{t1}, G_{t1}, D_{t1})=(E_{t2}, G_{t2}, D_{t2})$; calculating an average accuracy fitness across all champions for tasks in the multitask architecture; checkpointing the shared modules when the average accuracy fitness is best achieved; and attributing the best achieved average accuracy fitness determined from the task-specific routing evolution subprocess to each module (m) as part of a module evolution subprocess which further includes applying evolutionary operators to evolve modules (m).

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Figure 1:
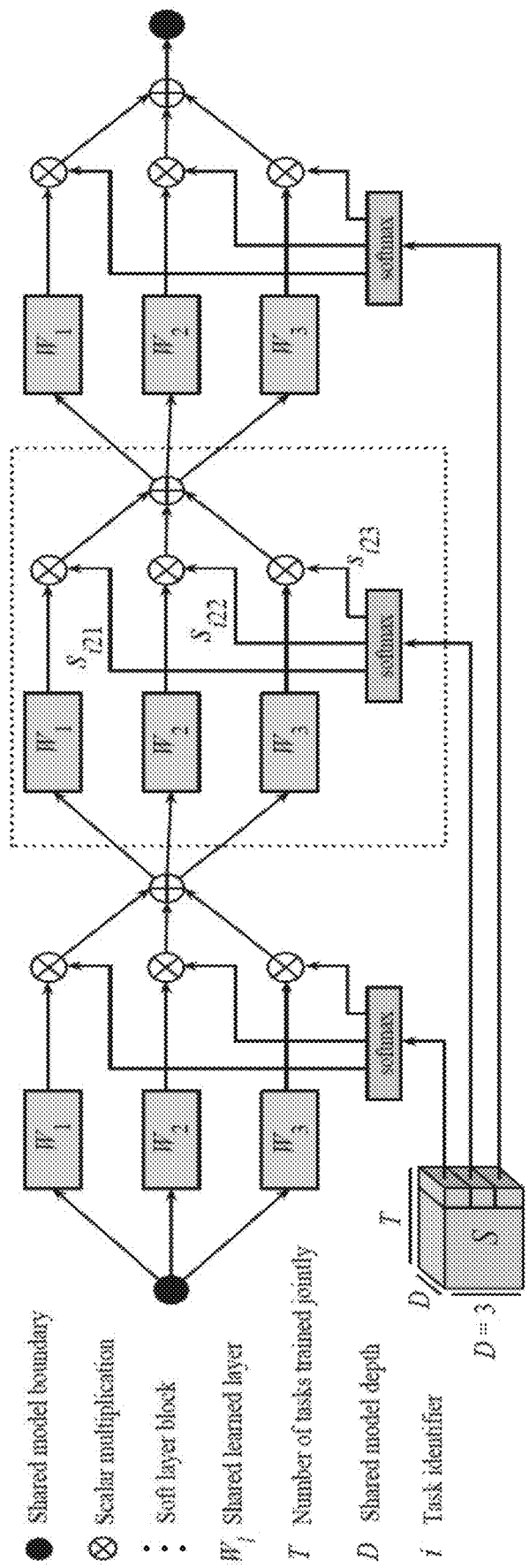
FIG. 1 is an exemplary soft ordering network for use with one or more embodiments herein.
Figure 2:
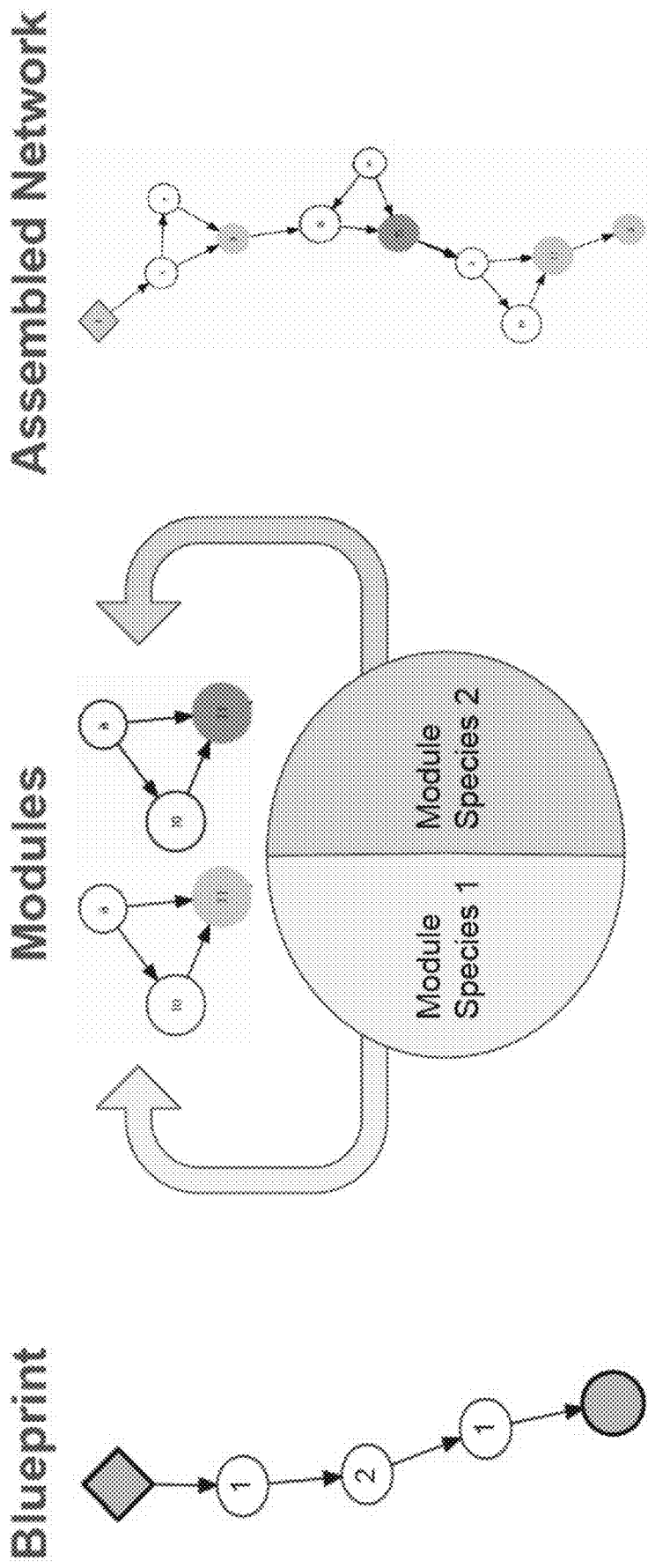
FIG. 2 illustrates a method of assembling networks for fitness evaluation in CoDeepNEAT.
Figure 3:
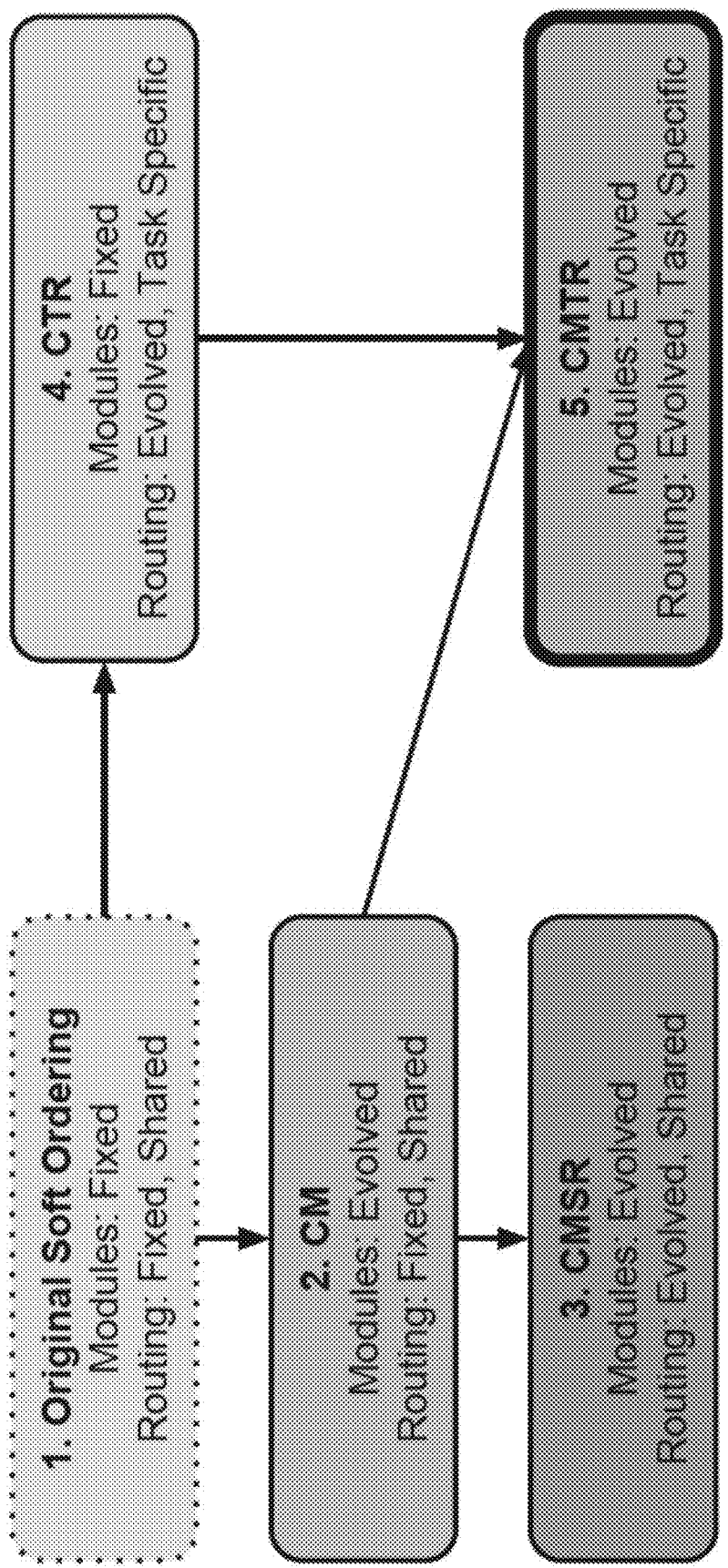
FIG. 3 provides an overview of the methods employed in the embodiments herein in multitask learning.

FIG. 3 provides an overview of the methods employed in the embodiments herein in multitask learning. The foundation is (1) the original soft ordering, which uses a fixed architecture for the modules and a fixed routing (i.e. network topology) that is shared among all tasks. This architecture is then extended in two ways with CoDeepNEAT: (2) by coevolving the module architectures (CM), and (3) by coevolving both the module architectures and a single shared routing for all tasks using (CMSR). This paper also introduces a novel approach (4) that keeps the module architecture fixed, but evolves a separate routing for each task during training (CTR). Finally, approaches (2) and (4) are combined into (5), where both modules and task routing are coevolved (CMTR). Table 1 gives high-level algorithmic descriptions of these methods, which are described in detail below.

TABLE 1

| CM Algorithm | CMSR Algorithm | CTR Algorithm | CMTR Algorithm |
| --- | --- | --- | --- |
| Given fixed blueprint Initialize module population Each generation: Assemble MTL networks with modules Randomly initialize all weights Train each MTL network with backprop Assign fitnesses to modules Update module populations | Initialize blueprint/module populations Each generation: Assemble MTL networks with blueprints/modules Randomly initialize all weights Train each MTL network with backprop Assign fitnesses to modules and blueprints Update blueprint/module populations | Given set of modules Initialize topology population for each task Randomly initialize all weights Each meta-iteration: Assemble networks Jointly train all networks with backprop Assign fitnesses to topologies Update topology populations | Initialize module population Each generation: Assemble sets of modules Train sets of modules with CTR Assign fitnesses to modules Update module populations |

Coevolution of Modules

In Coevolution of Modules (CM), CoDeepNEAT is used to search for promising module architectures, which are then inserted into appropriate positions to create an enhanced soft ordering network. The evolutionary process works as follows:

1. CoDeepNEAT initializes a population of modules MP. The blueprints are not used.
2. Modules are randomly chosen from each species in MP, grouped into sets M and are assembled into enhanced soft ordering networks.
3. Each assembled network is trained/evaluated on some task and its performance is returned as fitness.
4. Fitness is attributed to the modules, and NEAT evolutionary operators are applied to evolve the modules.
5. The process is repeated from step 1 until CoDeepNEAT terminates, i.e. no further progress is observed for a given number of generations.

Unlike in soft ordering, the number of modules and the depth of the network are not fixed but are evolved as global hyperparameters by CoDeepNEAT (however the layout is still a grid-like structure). Since the routing layout is fixed, the blueprint population of CoDeepNEAT, which determines how the modules are connected, is not used. Thus, one key operation in the original CoDeepNEAT, i.e. inserting modules into each node of the blueprint DAG, is skipped; only the module population is evolved.

To assemble a network for fitness evaluation, an individual is randomly chosen from each species in the module population to form an ordered set of distinct modules M. The hyperparameters evolved in each of the module's layers include the activation function, kernel size, number of filters, L2 regularization strength and output dropout rate. In addition, CoDeepNEAT also coevolves global hyperparameters that are relevant to the entire assembled network as a whole; these include learning rate, the number of filters of the final layer of each module, and the weight initialization method. Evolvable hyperparameters in each node include the activation function, kernel size, number of filters, L2 regularization strength and output dropout rate. The modules are then transformed into actual neural networks by replacing each node in the DAG with the corresponding layer. To ensure compatibility between the inputs and outputs of each module, a linear 1×1 convolutional layer (number of filters determined by a global hyperparameter), followed by a max-pooling layer (provided that the feature map before pooling is at least 4×4) is included as the last layer in each module.

The modules are then inserted into the soft ordering network. The architecture of the network is interpreted as a grid of K×D slots, where d indicates the depth of the network and the slots with the same k value have the same module topology. For each available slot $T_{kd}$, the corresponding module $M_k$ is inserted. If k>|M|, then $M_k$ mod |M| is inserted instead.

Finally, each module in a particular slot has the potential to share its weights with modules that have the same architecture and are located in other slots of the blueprint. Flag $F_k$ in each module indicates whether or not the module's weights are shared. This flag is evolved as part of the module genotype in CoDeepNEAT. Also, there is also global flag $F_d$ for each depth of the soft ordering network. If the $M_k$ is placed in $T_{kd}$ and both $F_k$ and $F_d$ are turned on, then the module is able to share its weights with any other $M_k$ whose slot have both flags turned on as well. Such an arrangement allows each slot to have sharing enabled and disabled independently.

The assembled network is attached to separate encoders and decoders for each task and trained jointly using a gradient-based optimizer. Average performance over all tasks is returned as fitness back to CoDeepNEAT. That fitness is assigned to each of the modules in the assembled network. If a module is used in multiple assembled networks, their fitnesses are averaged into module fitness. After evaluation is complete, standard NEAT mutation, crossover, and speciation operators are applied to create the next generation of the module population.

Coevolution of Modules/Shared Routing

Coevolution of Modules and Shared Routing (CMSR) extends CM to include blueprint evolution. Thus, the routing between various modules no longer follows the fixed grid-like structure, but instead an arbitrary DAG. Each node in the blueprint genotype points to a particular module species. During assembly, the blueprints are converted into deep multitask networks as follows:

1. For each blueprint in the population, an individual module is randomly chosen from each species.
2. Each node in the blueprint is then replaced by the module from the appropriate species.
3. If a module has multiple inputs from previous nodes in the blueprint, the inputs are soft merged first.
4. The process is repeated from step 1 until reaching a target number of assembled networks.

As in CM, each node in the blueprint has a flag $F_i$ that indicates whether node Ni should be shared or not. If two nodes are replaced by the same module and if both nodes have the sharing flag turned on, then the two modules will share weights. Such an arrangement allows each node to evolve independently whether they share weights or not. The training procedures for both CM and CMSR are otherwise identical. After fitness evaluation, the fitness is assigned to both blueprints and modules in the same manner as with CM. To accelerate evolution, the blueprint population is not initialized from minimally connected networks like the modules, but from randomly mutated networks that on average have five nodes.

Coevolution of Task Routing

The following multitask architecture search approach takes advantage of the dynamics of soft ordering by evolving task-specific topologies instead of a single blueprint. Like in soft ordering, in coevolution of task routing (CTR) there are K modules whose weights are shared everywhere they are used across all tasks. Like in blueprint evolution, CTR searches for the best ways to assemble modules into complete networks. However, unlike in blueprint evolution, CTR searches for a distinct module routing scheme for each task, and trains a single set of modules throughout evolution. Having a distinct routing scheme for each task makes sense if the shared modules are seen as a set of building blocks that are assembled to meet the differing demands of different problems. Training a single set of modules throughout evolution then makes sense as well: As modules are trained in different locations for different purposes during evolution, their functionality should become increasingly general, and it should thus become easier for them to adapt to the needs of a new location. Such training is efficient since the core structure of the network need not be retrained from scratch at every generation. In other words, CTR incurs no additional iterations of backpropagation over training a single fixed-topology multitask model. Because of this feature, CTR is related to PathNet, which evolves pathways through modules as those modules are being trained. However, unlike in PathNet, in CTR distinct routing schemes are coevolved across tasks, modules can be applied in any location, and module usage is adapted via soft merges.

CTR operates a variant of a (1+1) evolutionary strategy ((1+1)-ES) for each task. Separate ES for each task is possible because an evaluation of a multitask network yields a performance metric for each task. The (1+1)-ES is chosen because it is efficient and sufficiently powerful in experiments, though it can potentially be replaced by any population-based method. To make it clear that a single set of modules is trained during evolution, and to disambiguate from the terminology of CoDeepNEAT, for CTR the term meta-iteration is used in place of generation.

Each individual constitutes a module routing scheme for a particular task. At any point in evolution, the ith individual for the tth task is represented by a tuple ($E_{ti}$, $G_{ti}$, $D_{ti}$), where $E_{ti}$ is an encoder, $G_{ti}$ is a DAG, which specifies the module routing scheme, and $D_{ti}$ is a decoder. The complete model for an individual is then given by $$y_t = (\mathcal{D}_{ti} \circ \mathcal{R}(G_{ti}, \{\mathcal{M}_k\}_{k=1}^K) \circ \varepsilon_{ti})(x_t), \quad (1)$$

where R indicates the application of the shared modules $M_k$ based on the DAG $G_{ti}$. Note that "∘" denotes function composition and $E_{ti}$, and $D_{ti}$ can be any neural network functions that are compatible with the set of shared modules. In the experiments discussed herein, each $E_{ti}$ is an identity transformation layer, and each $D_{ti}$ is a fully connected classification layer.

$G_{ti}$ is a DAG, whose single source node represents the input layer for that task, and whose single sink node represents the output layer, e.g., a classification layer. All other nodes either point to a module $M_k$ to be applied at that location, or a parameterless adapter layer that ensures adjacent modules are technically compatible. In the experiments discussed herein, all adapters are 2×2 max-pooling layers. Whenever a node of $G_{ti}$ has multiple incoming edges, their contents are combined in a learned soft merge in accordance with the following learnable function:

$$softmerge(in_1, \ldots, in_M) = \sum_{m=1\ldots M} s_m in_m, \text{ with } \sum_{m=1\ldots M} s_m = 1, \quad (2)$$

The algorithm (1) begins by initializing the shared modules $\{M_k\}_{k=1}^{K}$ with random weights. Then, each champion ($E_{t1}$, $G_{t1}$, $D_{t1}$) is initialized, with $E_{t1}$ and $D_{t1}$ initialized with random weights, and $G_{t1}$ according to some graph initialization policy. For example, the initialization of $G_{t1}$ can be minimal or random. In the embodiments herein, $G_{t1}$ is initialized to reflect the classical deep multitask learning approach, i.e., $$\varepsilon_{t1} \to M_1 \to M_2 \to \ldots \to M_K \to \mathcal{D}_{t1}, \quad (3)$$

with adapters added as needed.

At the start of each meta-iteration, a challenger ($E_{t2}$, $G_{t2}$, $D_{t2}$) is generated by mutating the tth champion as follows (the insertion of adapters is omitted for clarity):
1. The challenger starts as a copy of the champion, including learned weights, i.e., ($E_{t2}$, $G_{t2}$, $D_{t2}$):=($E_{t1}$, $G_{t1}$, $D_{t1}$).
2. A pair of nodes (u, v) is randomly selected from $G_{t2}$ such that v is an ancestor of u.
3. A module $M_k$ is randomly selected from $\{M_k\}_{k=1}^{K}$
4. A new node w is added to $G_{t2}$ with $M_k$ as its function.
5. New edges (u,w) and (w,v) are added to $G_{t2}$.
6. The scalar weight of (w,v) is set such that its value after the softmax is some $\alpha \in (0,1)$. To initially preserve champion behavior, a is set to be small. I.e., if $s_1, \ldots, s_m$ are the scales of the existing inbound edges to v, $s_{m+1}$ is the initial scale of the new edge, and $s_{max} = \max(s_1, \ldots, s_m)$ then $$s_{m+1} = \ln\left(\frac{\alpha}{1-\alpha} \sum_{j=1\ldots m} e^{s_j - s_{max}}\right) + s_{max}.$$

After challengers are generated, all champions and challengers are trained jointly for M iterations with a gradient-based optimizer. Note that the scales of $G_{t1}$ and $G_{t2}$ diverge during training, as do the weights of $D_{t1}$ and $D_{t2}$. After training, all champions and challengers are evaluated on a validation set that is disjoint from the training data. The fitness for each individual is its performance for its task on the validation set and accuracy is the performance metric. If the challenger has higher fitness than the champion, then the champion is replaced, i.e., ($E_{t1}$, $G_{t1}$, $D_{t1}$)=($E_{t2}$, $G_{t2}$, $D_{t2}$). After selection, if the average accuracy across all champions is the best achieved so far, the entire system is checkpointed, including the states of the modules. After evolution, the champions and modules from the last checkpoint constitute the final trained model, and are evaluated on a held out test set.

Figure 4:
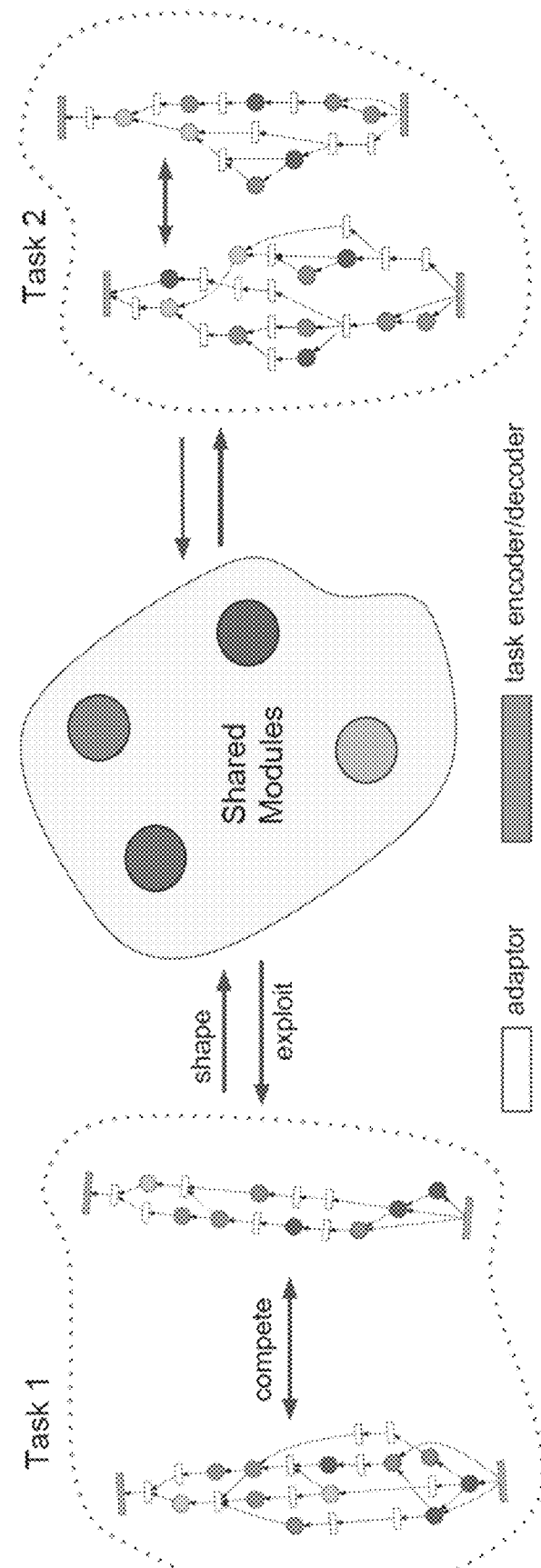
FIG. 4 illustrates an instance of coevolution of task routing with three tasks and four modules that are share across all tasks.

More than most evolutionary methods, this algorithm reflects an artificial ecology. The shared modules can be viewed as a shared finite set of environmental resources that is constantly exploited and altered by the actions of different tasks, which can correspond to different species in an environment. Within each task, individuals compete and cooperate to develop mutualistic relationships with the other tasks via their interaction with this shared environment. A visualization of CTR under this perspective is shown in FIG. 4. Importantly, even if a challenger does not outperform its champion, its developmental (learning) process still affects the shared resources. This perspective suggests a more optimistic view of evolution, in which individuals can have substantial positive effects on the future of the ecosystem even without reproducing.

Coevolution of Modules and Task Routing

Both CM and CTR improve upon the performance of the original soft ordering baseline. Interestingly, these improvements are largely orthogonal, and they can be combined to form an even more powerful algorithm called Coevolution of Modules and Task Routing (CMTR). Since evolution in CTR occurs during training and is highly computational efficient, it is feasible to use CoDeepNEAT as an outer evolutionary loop to evolve modules. To evaluate and assign fitness to the modules, they are passed on to CTR (the inner evolutionary loop) for evolving and assembling the task specific routings. The performance of the final task-specific routings is returned to CoDeepNEAT and attributed to the modules in the same way as in CM: Each module is assigned the mean of the fitnesses of all the CTR runs that made use of that module. Another way to characterize CMTR is that it overcomes the weaknesses in both CM and CTR: CM's inability to create a customized routing for each task and CTR's inability to search for better module architectures. CMTR's evolutionary loop works as follows:
1. CoDeepNEAT initializes a population of modules MP. The blueprints are not used.
2. Modules are randomly chosen from each species in MP and grouped together into sets of modules M.
3. Each set of modules $M_k$ is given to CTR, which assembles the modules by evolving task-specific routings. The performance of the evolved routings on a task is returned as fitness.
4. Fitness is attributed to the modules, and NEAT's evolutionary operators applied to evolve the modules.
5. The process repeats from step 2. until CoDeepNEAT terminates, i.e. no improvement for a given number of generations.

One difference between CMTR and CM is that each module's final convolutional layer has additional evolvable hyperparameters such as kernel size, activation function, and output dropout rate. Preliminary experiments suggested that the relatively complex routings in CMTR (when compared to CM and CMSR) require more complex final layers as well, thus evolving the complexity of the final layer is optimal. Like in CTR, the weights between modules are always shared in CMTR. If modules with completely new weights are added to the task routings, they have to be trained from scratch and may even hurt performance, whereas adding a module with already partially trained weights does not. In addition, as the routings evolved by CTR are much larger than those discovered by CM and CMSR, disabling or evolving weight sharing significantly bloats the total number of weight parameters and slows training significantly.

Experiments and Results

The Omniglot dataset consists of 50 alphabets of handwritten characters, each of which induces its own character recognition task. There are 20 instances of each character, each a 105×105 black and white image. Omniglot is a good fit for MTL, because there is clear intuition that knowledge of several alphabets will make learning another one easier. Omniglot has been used in an array of settings: generative modeling, one-shot learning, and deep MTL. Previous deep MTL approaches used random training/testing splits for evaluation. However, with model search (i.e. when the model architecture is learned as well), a validation set separate from the training and testing sets is needed. Therefore, in the experiments utilizing the present embodiments, a fixed training/validation/testing split of 50%/20%/30% is introduced for each task. Because training is slow and increases linearly with the number of tasks, a subset of 20 tasks out of the 50 possible is used in the current experiments. These tasks are trained in a fixed random order. Soft ordering is the current state-of-the-art method in this domain. The experiments therefore use soft ordering as a starting point for designing further improvements.

For CoDeepNEAT fitness evaluations, all networks are trained using Adam for 3000 iterations over the 20 alphabets; for CTR, the network is trained for 120 meta-iterations (30,000 iterations). Each iteration is equivalent to one full forward and backward pass through the network with a single example image and label chosen randomly from each task. The fitness assigned to each network is the average validation accuracy across the 20 tasks after training.

For CM and CMSR, CoDeepNEAT is initialized with approximately 50 modules (in four species) and 20 blueprints (in one species). For CMTR, a smaller module population of around 25 (in two species) is found to be beneficial in reducing noise since each module is evaluated more often. During each generation, 100 networks are assembled from modules and/or blueprints for evaluation. With CoDeepNEAT, the evaluation of assembled networks is distributed over 100 separate EC2 instances with a K80 GPU in AWS. The average time for training is usually around 1-2 hours depending on the network size. With CTR, because it is a (1+1) evolutionary strategy with a small population size, it is sufficient to run the algorithm on a single GPU.

Because the fitness returned for each assembled network is noisy, to find the best assembled CoDeepNEAT network, the top 50 highest fitness networks from the entire history of the run are retrained for 30,000 iterations. For the CM and CMSR experiments, decaying the learning rate by a factor of 10 after 10 and 20 epochs of training gave a moderate boost to performance. Similar boost is not observed for CTR and CMTR and therefore learning rate is not decayed for them. To evaluate the performance of the best assembled network on the test set (which is not seen during evolution or training), the network is trained from scratch again for 30,000 iterations. For CTR and CMTR, this is equivalent to training for 120 meta-iterations. During training, a snapshot of the network is taken at the point of highest validation accuracy. This snapshot is then evaluated and the average test accuracy over all tasks returned.

Figure 5:
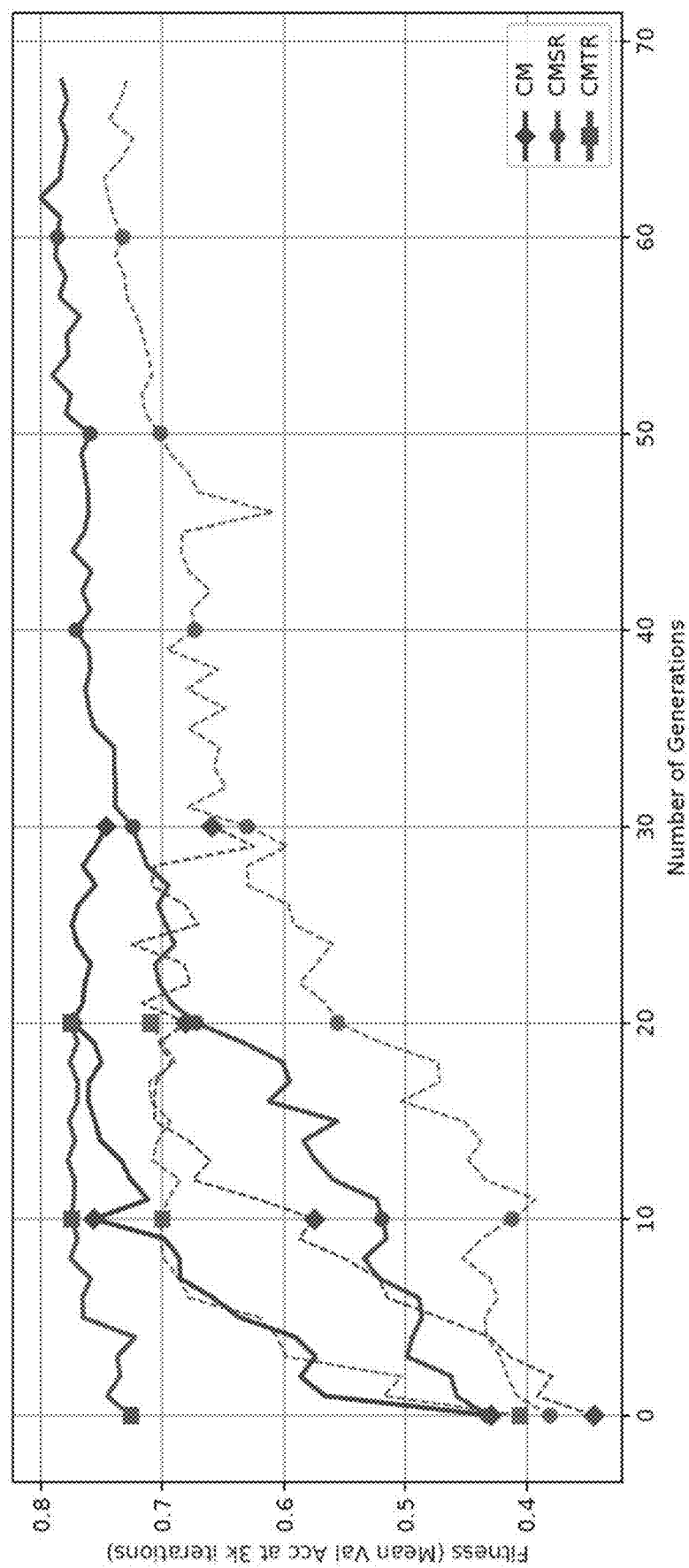
FIG. 5 illustrates comparison of fitness over generations of single runs of CM (Coevolution of Modules), CMSR (Coevolution of Modules and Shared Routing), and CMTR in accordance with one or more embodiments herein.
Figure 6:
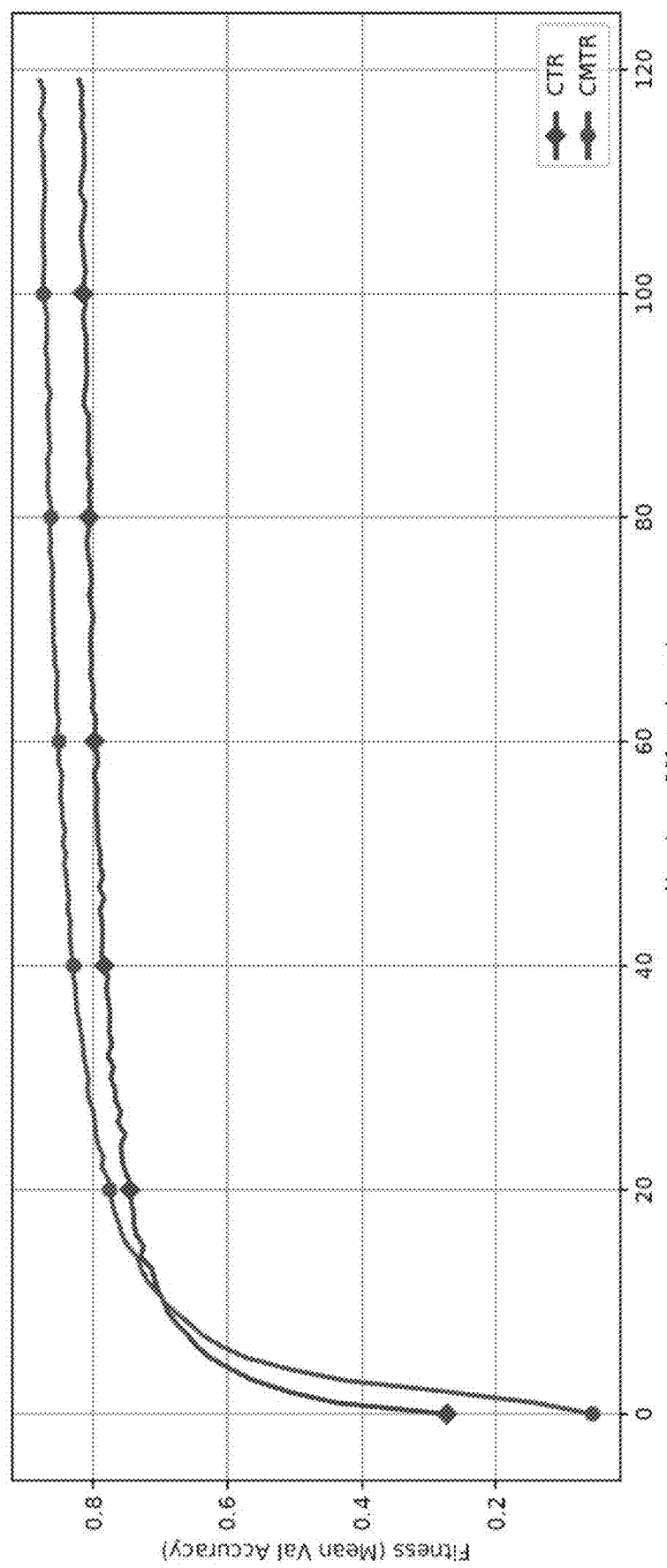
FIG. 6 illustrates comparison of fitness over number of meta-iterations of training for CTR (Coevolution of Task Routing) and CMTR (Coevolution of Modules and Task Routing) in accordance with one or more embodiments herein.

FIG. 5 demonstrates how the best and mean fitness improves for CM, CMSR, and CMTR in the CoDeepNEAT outer loop where module/blueprint coevolution occurs. All three algorithms converge roughly to the same final fitness value, which is around 78% validation accuracy. CMTR converges the fastest, followed by CM, and lastly CMSR. This result is expected since the search space of CMTR is the smallest (only the modules are evolved with CoDeepNEAT), larger for CM (evolution of modules and weight sharing), and largest for CMSR (evolution of modules, blueprints, and weight sharing). Although CM, CMSR, and CMTR converge to the same fitness in evolution, CMTR achieves better final performance because training occurs via CTR. FIG. 6 compares how fitness (i.e. average validation accuracy) improves for CTR (using the default modules) and CMTR (using the best evolved modules discovered by CMTR) during training, averaged over 10 runs. Interestingly, while CTR improves faster in the first 10 meta-iterations, it is soon overtaken by CMTR, demonstrating how evolution discovers modules that leverage the available training better.

Figure 7:
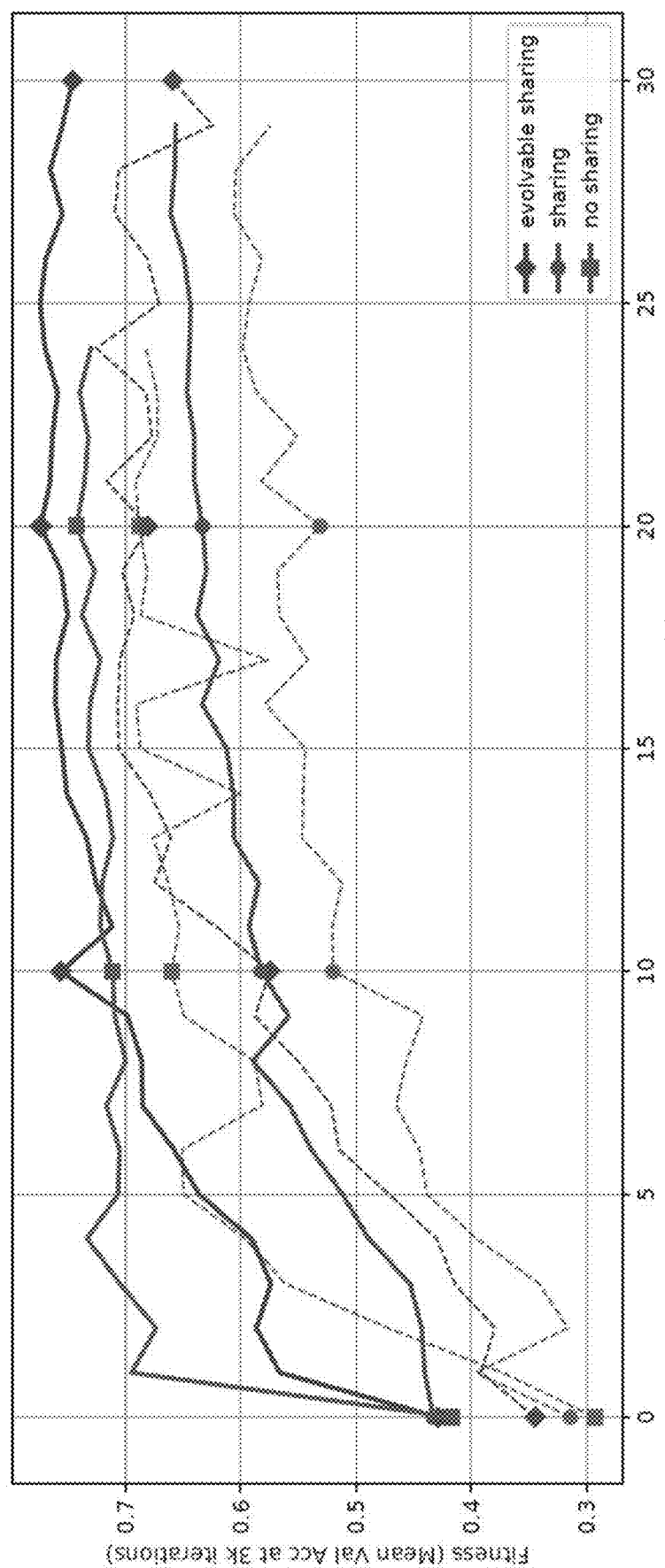
FIG. 7 illustrates comparison of fitness over generations of CM with disabling, enabling, and evolving module weight sharing in accordance with one or more embodiments herein.
Figure 8A:
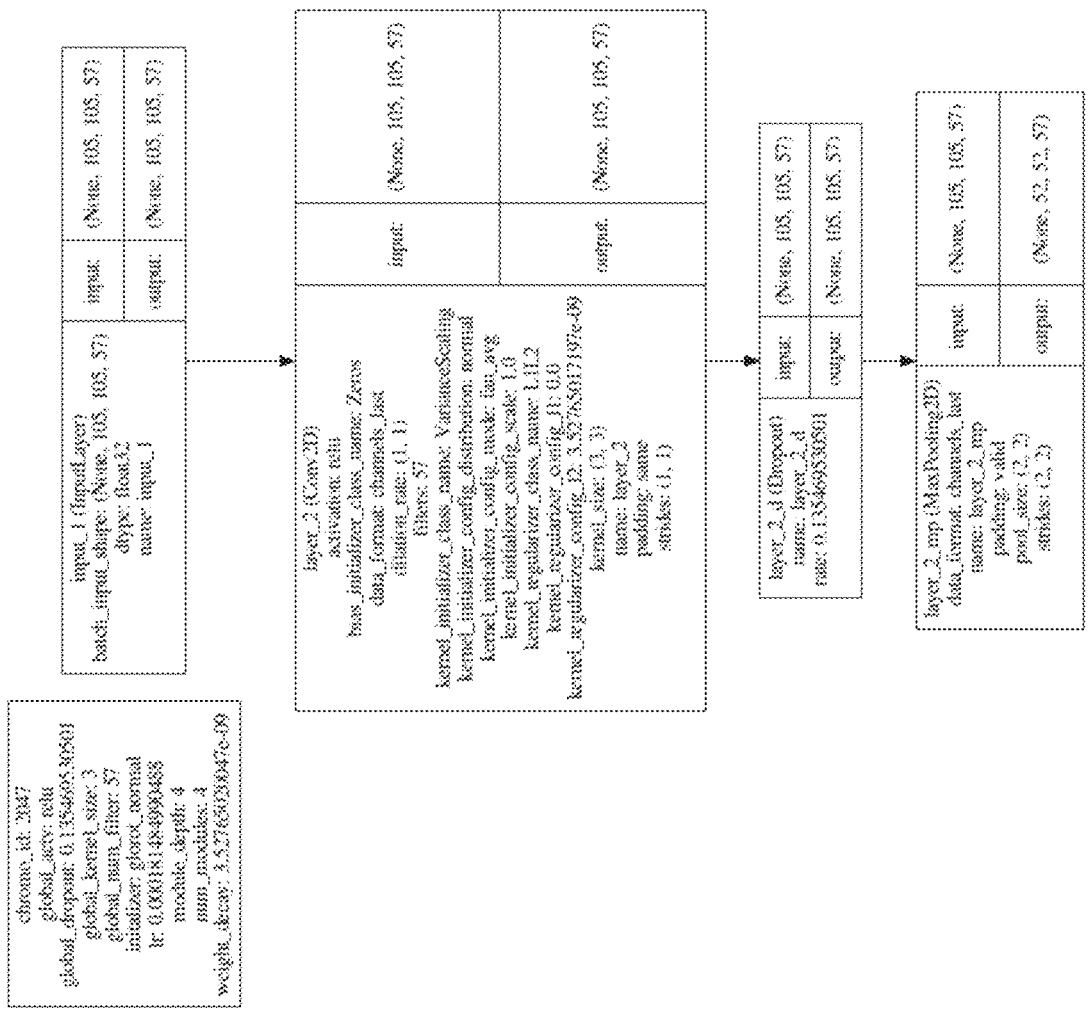
FIGS. 8*a*, 8*b*, 8*c*, 8*d* illustrates exemplary best performing modules from the CMTR experiment, and sample routing topologies evolved for different exemplary alphabets.
Figure 8B:
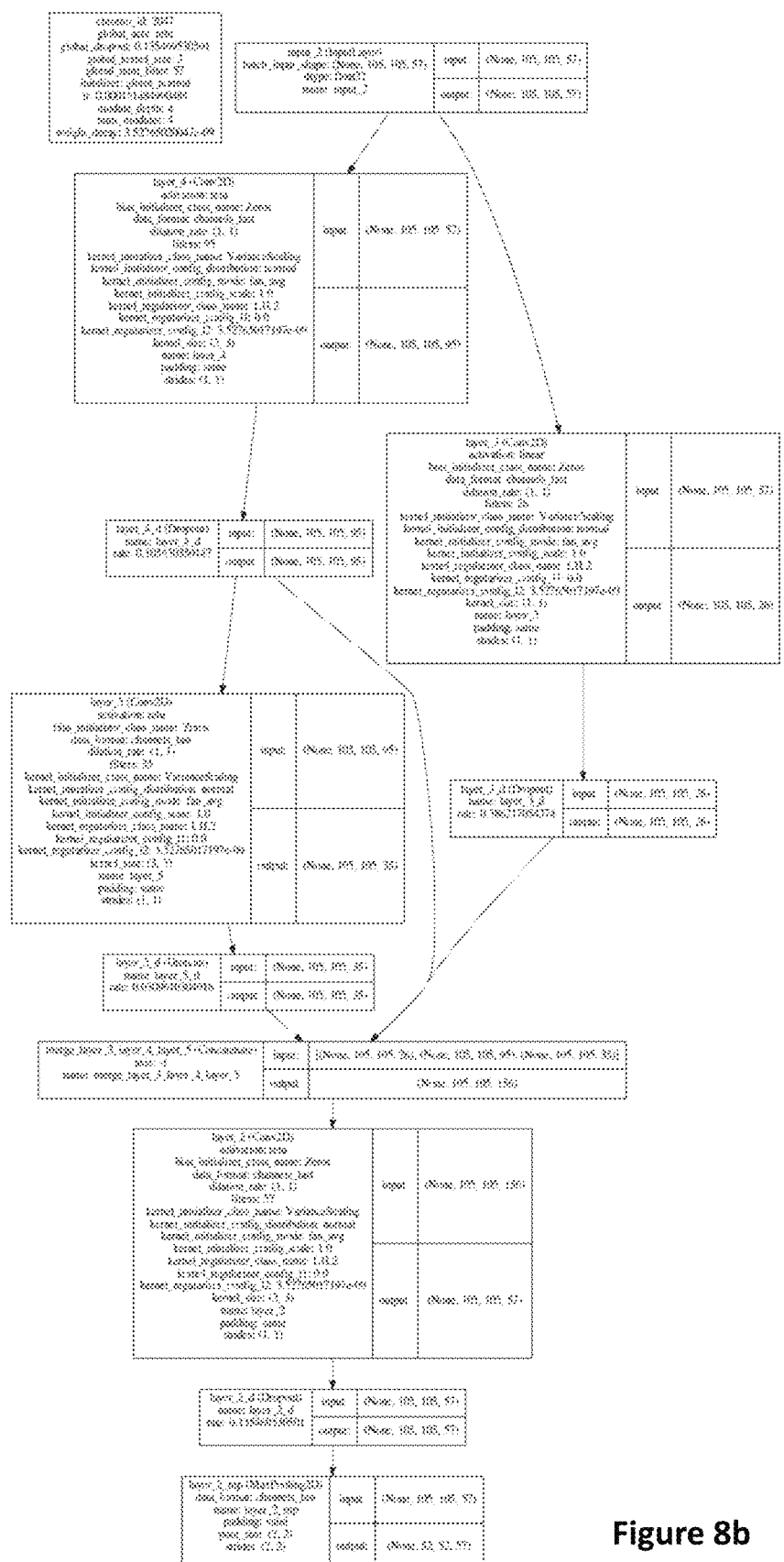
Figure 8D:
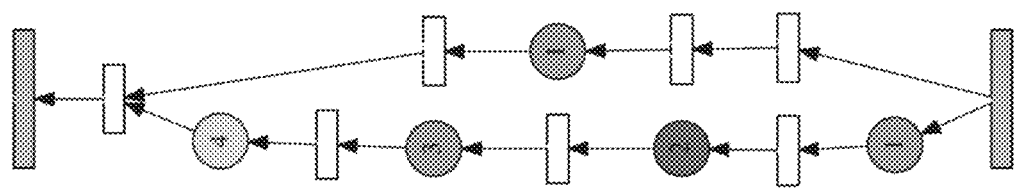
Figure 8D:
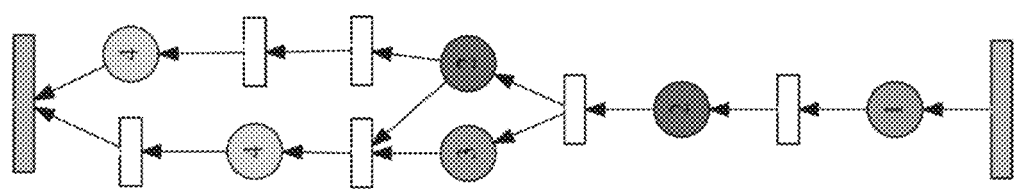
Figure 8C:
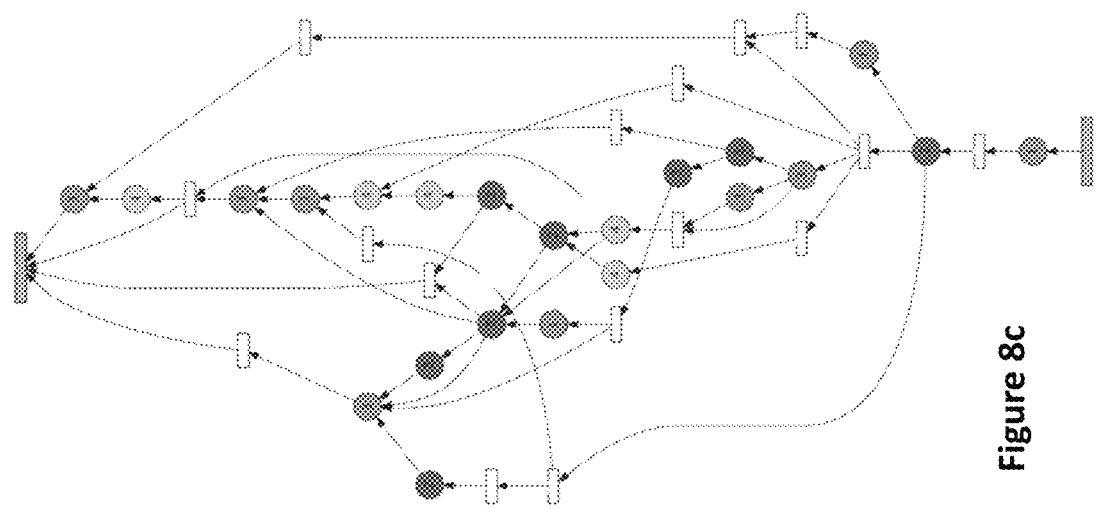

One open question is how much sharing of weights between modules affects the performance of the assembled network. Although disabling weight sharing is not optimal for CTR due to the complexity of the routing, both CM and CMSR may benefit since their routing topologies are much smaller (minimizing the effects of parameter bloat). FIG. 7 compares the effect of enabling, disabling, and evolving weight sharing with CM. Interestingly, disabling weight sharing leads to better performance than enabling it, but evolving it is best. Thus, the design choice of evolving sharing in CM and CMSR is vindicated. An analysis of the architecture of the best assembled networks shows that weight sharing in particular locations such as near the output decoders is a good strategy.

Table 2 shows the validation and test accuracy for the best evolved network produced by each method, averaged over 10 runs. The best-performing methods are highlighted in bold and standard error for the 10 runs is shown in parenthesis. In addition, performance of the baseline methods are shown, namely (1) a hand designed single-task architecture, i.e. where each task is trained and evaluated separately, and (2) the soft ordering network architecture. Indeed, the methods improve upon the baseline according to increasing complexity: Evolving modules and evolving topologies is significantly better than the baselines, and evolving both is significantly better than either alone. CMTR, the combination of CoDeepNEAT and routing evolution, combines the advantages of both and performs the best.

TABLE 2

| Algorithm | Val Accuracy (%) | Test Accuracy (%) |
|---|---|---|
| 1. Single Task [29] | 63.59 (0.53) | 60.81 (0.50) |
| 2. Soft Ordering [29] | 67.67 (0.74) | 66.59 (0.71) |
| 3. CM | 80.38 (0.36) | 81.33 (0.27) |
| 4. CMSR | 83.69 (0.21) | 83.82 (0.18) |
| 5. CTR | 82.48 (0.21) | 82.36 (0.19) |
| 6. CMTR | 88.20 (1.02) | 87.82 (1.02) |

This series of results confirms the intuition well: as a baseline, soft ordering performs significantly better in each task than single-task training (67% vs. 61% accuracy). Evolution of modules and topologies improves significantly upon soft ordering. Coevolution of modules and topologies together improves even more, and the capstone architecture turns out to be the best (at 88%). The results thus demonstrate three general points: evolutionary architecture search can make a large difference in performance of deep learning networks; MTL can improve performance of deep learning tasks; and putting these together results in a particularly powerful approach.

The best networks have approximately three million parameters. FIGS. 8a, 8b, 8c and 8d visualize one of the best performing modules from the CMTR experiment (8a, 8b), and sample routing topologies evolved for the different alphabets (8c, 8d). Because the CoDeepNEAT outer loop is based on two species, the four modules passed to the CTR inner loop consist of two different designs (but still separate weights). Thus, evolution has discovered that a combination of simple and complex modules is beneficial. Similarly, while the routing topologies for some alphabets are simple, others are very complex. Moreover, similar topologies emerge for similar alphabets (such as those that contain prominent horizontal lines, like Gurmukhi and Manipuri). Also, when evolution is run multiple times, similar topologies for the same alphabet result. Such useful diversity in modules and routing topologies, i.e. structures that complement each other and work well together, would be remarkably difficult to develop by hand. However, evolution discovers them consistently and effectively, demonstrating the power of the approach.

The experiments show that MTL can improve performance significantly across tasks, and that the architecture used for it matters significantly. First, modules used in the architecture can be optimized and do end up different in a systematic way. Unlike in the original soft ordering architecture, evolution in CM, CMSR, and CMTR results in discovery of a wide variety of simple and complex modules, and they are often repeated in the architecture. Evolution thus discovers a useful set of building blocks that are diverse in structure. Second, the routing of the modules matter as well. In CMSR, the shared but evolvable routing allows much more flexibility in how the modules can be reused and extends the principals that makes soft ordering useful. The power of CTR and CMTR is from evolving different topologies for different tasks, and tie the tasks together by sharing the modules in them. In addition, sharing components (including weight values) in CMTR is crucial to its performance. If indeed the power from multitasking comes from integrating requirements of multiple tasks, this integration will happen in the embeddings that the modules form, so it makes sense that sharing plays a central role. Third, compared to the CTR and CMTR, CM and CMSR have evolved away from sharing of module weights, despite the fact that module architectures are often reused in the network. This result makes sense as well: because the topology is shared in this approach, the differentiation between tasks comes from differentiated modules. Such an approach is an opposite way to solve the problem. Even though it is an effective approach as well, it is not quite as powerful as differentiated topologies and shared modules.

One skilled in the art will recognize the variations to the embodiments herein that, thought not explicitly described, are within the scope of the embodiments.

The invention claimed is:

1. A processor implemented method for evolving task-specific topologies in a multitask architecture comprising:
    establishing a set of shared modules which are shared among each task-specific topology;
    initializing the shared modules $\{M_k\}_{k=1}^{K}$ with random weights;
    initializing a champion individual module routing scheme for each task (t), wherein the ith individual for the tth task is represented by a tuple $(E_{ti}, G_{ti}, D_{ti})$, and further wherein $E_{ti}$ is an encoder, $G_{ti}$ is a DAG, which specifies the individual module routing scheme, and $D_{ti}$ is a decoder, with $E_{ti}$ and $D_{ti}$ initialized with random weights;
    for each champion individual $(E_{ti}, G_{ti}, D_{ti})$, generating a challenger $(E_{t2}, G_{t2}, D_{t2})$ by mutating the tth champion in accordance with a predetermined mutation subprocess;
    jointly training each champion and challenger for M iterations on a training set of data;
    evaluating each champion and challenger on a validation set of data to determine an accuracy fitness for each individual champion and challenger for its predetermined task;
    if a challenger has higher accuracy fitness than a corresponding champion, then the champion is replaced wherein $(E_{ti}, G_{ti}, D_{ti})=(E_{t2}, G_{t2}, D_{t2})$;
    calculating an average accuracy fitness across all champions for tasks in the multitask architecture; and
    checkpointing the shared modules when the average accuracy is best achieved.

2. The process according to claim 1, wherein the predetermined mutation subprocess of includes:
    (i) start as a copy of the champion, including learned weights, wherein $(E_{t2}, G_{t2}, D_{t2}):=(E_{ti}, G_{ti}, D_{ti})$;
    (ii) randomly select a pair of nodes (u, v) from $G_{t2}$ such that v is an ancestor of u;
    (iii) randomly select a module $M_k$ from the shared modules;
    (iv) add a new node w to $G_{t2}$ with $M_k$ as its function;
    (v) add new edges (u,w) and (w,v) to $G_{t2}$;
    (vi) set the scalar weight of (w,v) such that its value after softmax is some $\alpha \in (0,1)$.

3. The process according to claim 1, wherein the training set of data and the validation set of data are disjointed.

4. The process according to claim 1, wherein $G_{ti}$ is initialized in accordance with a graph initialization policy.

5. The process according to claim 1, wherein a model for an individual is then given by $$y_t = (\mathcal{D}_{ti} \circ \mathcal{R}(G_{ti}, \{M_k\}_{k=1}^{K}) \circ \varepsilon_{ti})(x_t),$$

where R indicates application of the shared modules $M_k$ based on the DAG $G_{ti}$.

6. The process according to claim 5, wherein $E_{ti}$ and $D_{ti}$ are selected from a grouping consisting of neural network functions that are compatible with the set of shared modules.

7. The process according to claim 6, wherein each $E_{ti}$ is an identity transformation layer, and $D_{ti}$ is a fully connected classification layer.

8. The process according to claim 1, wherein $G_{ti}$ is a DAG whose single source node represents the input layer for that task (t), and whose single sink node represents the output layer and further wherein all other nodes either point to a module $M_k$ to be applied at that location, or to a parameterless adapter layer for ensuring adjacent modules are technically compatible.

9. A processor implemented method for evolving task-specific topologies and shared modules in a multitask architecture comprising:
    initializing a population of modules and randomly selecting modules (m) from each species in the population and grouping selected modules from each species (k) together into sets of modules $M_k$;
    providing the sets of modules $M_k$ to a task-specific routing evolution subprocess, wherein the subprocess:
        establishes a set of shared modules which are shared among each task-specific topology;

initializes a champion individual module routing scheme for each task (t), wherein the ith individual for the tth task is represented by a tuple ($E_{ti}$, $G_{ti}$, $D_{ti}$), and further wherein $E_{ti}$ is an encoder, $G_{ti}$ is a DAG, which specifies the individual module routing scheme, and $D_{ti}$ is a decoder, with $E_{ti}$ and $D_{ti}$ initialized with random weights;

for each champion individual ($E_{ti}$, $G_{ti}$, $D_{ti}$), generating a challenger ($E_{t2}$, $G_{t2}$, $D_{t2}$) by mutating the tth champion in accordance with a predetermined mutation subprocess;

jointly training each champion and challenger for M iterations on a training set of data;

evaluating each champion and challenger on a validation set of data to determine an accuracy fitness for each individual champion and challenger for its predetermined task;

if a challenger has higher accuracy fitness than a corresponding champion, then the champion is replaced wherein ($E_{ti}$, $G_{ti}$, $D_{ti}$)=($E_{t2}$, $G_{t2}$, $D_{t2}$);

calculating an average accuracy fitness across all champions for tasks in the multitask architecture;

checkpointing the shared modules when the average accuracy fitness is best achieved;

attributing the best achieved average accuracy fitness determined from the task-specific routing evolution subprocess to each module (m) as part of a module evolution subprocess which further includes applying evolutionary operators to evolve modules (m).

10. The process according to claim 9, wherein the predetermined mutation subprocess of the task-specific routing evolution subprocess includes:
(i) start as a copy of the champion, including learned weights, wherein ($E_{t2}$, $G_{t2}$, $D_{t2}$):=($E_{ti}$, $G_{ti}$, $D_{ti}$);
(ii) randomly select a pair of nodes (u,v) from $G_{t2}$ such that v is an ancestor of u;
(iii) randomly select a module $M_k$ from the shared modules;
(iv) add a new node w to $G_{t2}$ with $M_k$ as its function;
(v) add new edges (u,w) and (w,v) to $G_{t2}$;
(vi) set the scalar weight of (w,v) such that its value after softmax is some $\alpha \in (0,1)$.

* * * * *